United States Patent
Whipple, II

(10) Patent No.: US 6,795,833 B1
(45) Date of Patent: Sep. 21, 2004

(54) METHOD FOR ALLOWING VERIFICATION OF ALTERATIONS TO THE CATALOGING STRUCTURE ON A COMPUTER STORAGE DEVICE

(75) Inventor: Albert E. Whipple, II, Kingwood, TX (US)

(73) Assignee: Alsoft, Inc., Houston, TX (US)

( * ) Notice: Subject to any disclaimer, the term of this patent is extended or adjusted under 35 U.S.C. 154(b) by 0 days.

(21) Appl. No.: 09/401,675

(22) Filed: Sep. 22, 1999

(51) Int. Cl.$^7$ .............................................. G06F 12/00
(52) U.S. Cl. .................... 707/204; 707/202; 707/10; 707/1
(58) Field of Search .............................. 707/1–10, 101, 707/202, 204; 714/7, 8; 713/200

(56) References Cited

U.S. PATENT DOCUMENTS

| | | | | |
|---|---|---|---|---|
| 5,313,631 A | * | 5/1994 | Kao ........................... | 707/204 |
| 5,481,701 A | * | 1/1996 | Chambers, IV ............. | 707/101 |
| 5,537,585 A | * | 7/1996 | Blickenstaff et al. ....... | 707/204 |
| 5,684,991 A | * | 11/1997 | Malcolm .................... | 707/204 |
| 5,764,972 A | * | 6/1998 | Crouse et al. ............. | 707/204 |
| 5,819,020 A | * | 10/1998 | Beeler, Jr. .................. | 707/204 |
| 5,829,045 A | * | 10/1998 | Motoyama .................... | 714/7 |
| 5,832,513 A | | 11/1998 | Kennedy ..................... | 707/202 |
| 5,897,638 A | * | 4/1999 | Lasser et al. ............... | 707/102 |
| 5,922,072 A | * | 7/1999 | Hutchinson et al. .......... | 713/2 |
| 5,991,402 A | * | 11/1999 | Jia et al. ..................... | 713/166 |
| 5,991,753 A | * | 11/1999 | Wilde ........................... | 707/2 |
| 6,073,252 A | * | 6/2000 | Moyer et al. ................. | 714/7 |
| 6,185,574 B1 | * | 2/2001 | Howard et al. ............. | 707/202 |

\* cited by examiner

*Primary Examiner*—Alford Kindred
*Assistant Examiner*—Anh Ly
(74) *Attorney, Agent, or Firm*—Mary J. Gaskin

(57) ABSTRACT

The alterations to a cataloging structure on a computer storage device can be verified in order to determine their beneficial effect prior to replacing the original cataloging structure. The method intercepts accesses to the storage device and redirects them to an alternate cataloging structure; it also denies write accesses to the storage device.

6 Claims, 4 Drawing Sheets

METHOD FOR ALLOWING VERIFICATION OF ALTERATIONS TO THE CATALOGING STRUCTURE ON A COMPUTER STORAGE DEVICE

TECHNICAL FIELD

This invention generally relates to a method for allowing verification of alterations to the cataloging structure of a computer storage device for the purpose of determining the beneficial effect of the alterations prior to implementing them.

BACKGROUND OF THE INVENTION

In a computer system, when information is stored on a storage device, it is cataloged so that the information can be retrieved when desired. Each separate body of information is termed a file. Various filing systems have been devised to maintain a directory of the files and the addresses on the device where their information is actually stored. Each file is retrieved using its associated name. A hierarchical filing system uses a starting, or root, directory, which can contain files and additional directories. Each additional directory is also capable of containing files and additional directories.

A filing system is comprised of a cataloging structure. The file and directory information in the cataloging structure is known as catalog data. There are many different filing systems using a variety of cataloging structures. A common problem affecting cataloging structures is their susceptibility to corruption. Corruption can occur for many reasons, including hardware failure and software bugs. As a result of the corruption, files, or even the entire storage device may be rendered inaccessible. Another common problem affecting sophisticated cataloging structures is that adding, deleting and modifying catalog data will typically result in inefficient storage of the catalog data within the cataloging structure. Examples of sophisticated cataloging structures are the Hierarchical File System (HFS) developed by Apple Computer, Inc. of Cupertino, Calif. (as described in U.S. Pat. No. 4,945,475, Bruffey et al.), and the High Performance File System (HPFS) developed by Microsoft Corporation of Redmond, Wash. (as described in U.S. Pat. No. 5,371,885, Letwin). The storage inefficiency results in a significant increase in the amount of time required to access catalog data.

Numerous computer programs ("storage utilities") have been written that alter cataloging structures to repair corruption or to correct storage inefficiencies. Storage utilities that repair cataloging structures are often unable to correctly diagnose corruption to a sophisticated cataloging structure. Incorrect diagnosis results in incorrect repairs, often making the corruption worse. Further, because countless possible combinations of corruption can occur, those skilled in the art are unable to create a patching-type repair program that can repair all the corruption. A storage utility that corrects cataloging structure storage inefficiencies can make improper alterations to a cataloging structure due to corruption in the cataloging structure. Improper alterations to a corrupt cataloging structure are undesirable because they typically make the corruption worse. For example, files that were previously accessible may become inaccessible. In an extreme case, an entire storage device may be rendered inaccessible.

In an attempt to offer a user the ability to change his mind after making alterations to a cataloging structure, some storage utilities that repair corrupt cataloging structures now provide an option to undo the alterations. The undo method relies upon storing a copy of the original, unaltered cataloging structure on a separate, nonvolatile storage device (such as a hard disk) and later using the copy to restore the altered cataloging structure to the unaltered state.

The undo method is not a satisfactory solution to the problem caused by undesirable alterations. First, a separate nonvolatile storage device on which to store a copy of the unaltered cataloging structure may not exist. Secondly, an existing separate nonvolatile storage device may not have sufficient free storage to contain a copy of the original cataloging structure. Thirdly, files and directories in the altered cataloging structure may have been further altered by another program in the interim before the undo option is selected. Additionally, new files and directories may have been added to the altered cataloging structure and would be lost if the cataloging structure were restored to the unaltered state. For these reasons, the undo method can cause information on the storage device to become inaccessible.

SUMMARY OF THE INVENTION

An object of the present invention is to allow verification of alterations to the cataloging structure of a computer storage device by facilitating the use of a copy of the cataloging structure containing the alterations. The copy can be located on any type of writable storage device or in memory.

Another object of the present invention is to allow access to and examination of files and directories that are inaccessible, specifically when the present invention is used in conjunction with a storage utility that repairs cataloging structures.

An additional object of the present invention is to facilitate a comparison of the altered cataloging structure and the original cataloging structure.

Another object of the present invention is to prevent undesired alterations from being made to a storage device with a corrupt cataloging structure when such alterations would prevent the information contained on the storage device from being retrieved by using methods other than repairing the cataloging structure.

The objects of the present invention are accomplished by intercepting accesses to a storage device such that read accesses to the cataloging structure of the storage device are redirected to an alternate cataloging structure, and write accesses to the cataloging structure of the storage device are denied. Read accesses to other locations of the storage device are not redirected, but write accesses are denied. As a result, the storage device is entirely read-only, and the alternate cataloging structure functions as a read-only cataloging structure for the storage device containing the original cataloging structure.

Storage utilities that incorporate the present invention will make alterations to a copy of the cataloging structure of a storage device. This altered cataloging structure is located separately from the original cataloging structure, whether in the storage device containing the original cataloging structure, another storage device, or the memory. Upon request, the present invention can make the altered cataloging structure function as the cataloging structure for the storage device containing the original cataloging structure. The alterations to the cataloging structure can then be verified, by a computer program or by a computer operator, to determine if the alterations are desired.

If the present invention is used with a storage utility that repairs corrupt cataloging structures, then the altered cataloging structure will contains the repairs. Since the repaired cataloging structure functions as the cataloging structure for the storage device, files and directories that were previously inaccessible will be accessible.

Finally, the present invention allows access to the original cataloging structure in order to permit a computer program or a computer operator to compare the original cataloging structure with the altered cataloging structure. If a determination is made that the alterations to the cataloging structure are beneficial, the storage utility that altered the cataloging structure will replace the contents of the original cataloging structure with the contents of the altered cataloging structure. If, however, a determination is made that the alterations to the cataloging structure are not desired, then the original cataloging structure remains unchanged. Because the altered cataloging structure and the storage device are read-only, no information can be lost because no other program can have modified the storage device while the altered cataloging structure was functioning as the cataloging structure for the device. Whether or not the original cataloging structure is replaced, the present invention is requested to stop redirecting access to the altered cataloging structure, and the storage utility that altered the cataloging structure disposes of the altered cataloging structure.

DESCRIPTION OF THE PREFERRED EMBODIMENT

Figure 1:
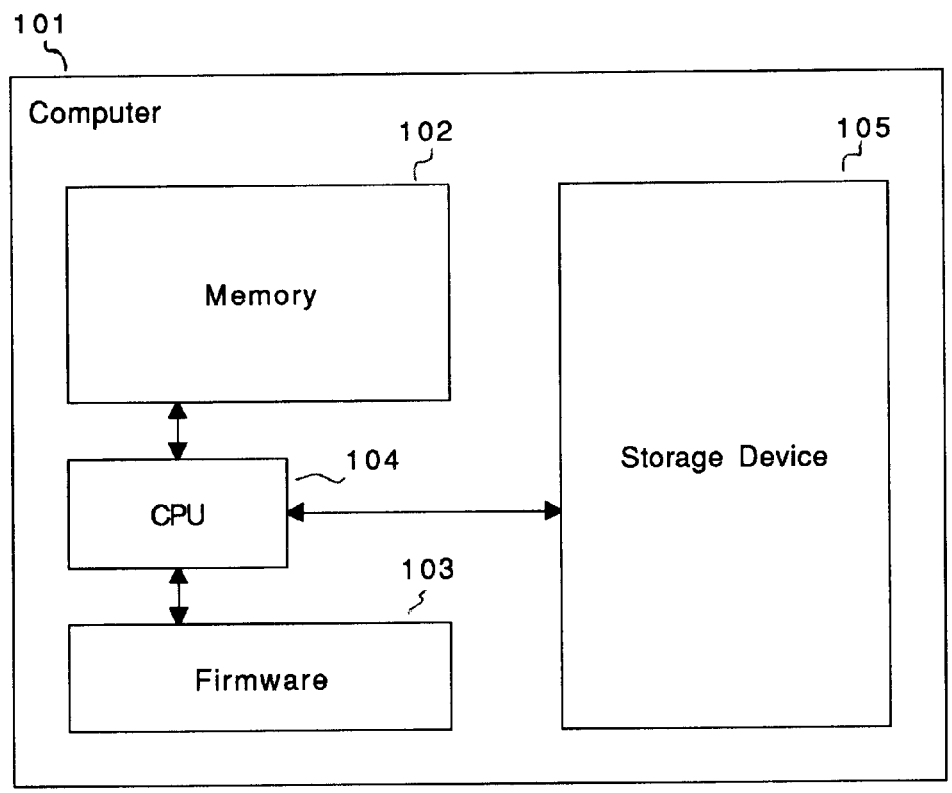
FIG. 1 depicts a simplified block diagram of a computer suitable for practicing a preferred embodiment of the present invention.

The method of the present invention is illustrated here as a device driver for a storage device. It will be understood by those skilled in the art and having the benefit of this disclosure that the disclosure is not presented as a limitation on the claimed subject matter.

In the drawings, usual flow diagram conventions are followed. Specifically, a diamond-shaped block represents a logical operation, such as a test or compare function, and a rectangular-shaped block represents a step in a sequence of steps.

Referring now to the drawings, more particularly to FIG. 1, a block diagram of a typical computer system that can beneficially utilize the present invention is represented. The computer 101 contains a memory 102, a firmware 103, a central processing unit (CPU) 104, and a storage device 105.

The memory 102 acts as a storage area for computer programs that are being executed by the CPU 104. Alternatively, computer programs can be stored and executed in firmware 103. The CPU 104 transfers information between the storage device 105 and the memory 102; it also executes computer programs residing within the memory 102 or the firmware 103. The storage device 105 can be any of a variety of storage devices including, but not limited to, hard disks, floppy disks, and compact discs.

Although storage device 105 is depicted as being inside the computer 101, storage devices can also be situated outside of a computer 101.

The preferred embodiment of the present invention operates within either the memory 102 or the firmware 103 of a computer 101. The present invention operates upon the storage device 105 of the computer 101. It is understood by one skilled in the art that the present invention can also be used on other types of storage devices. Further, the present invention can be used on storage devices connected to other electronic equipment.

Figure 2:
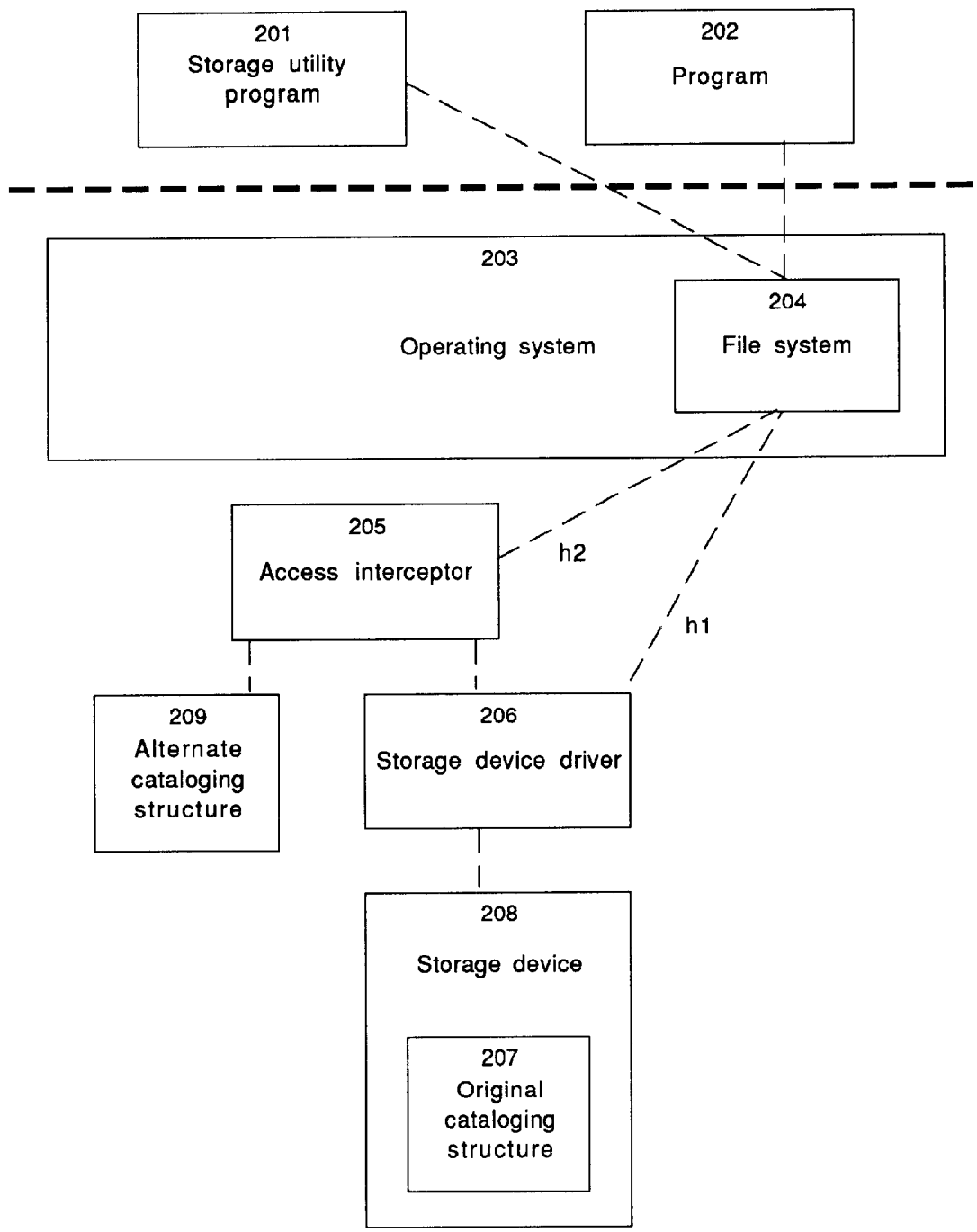
FIG. 2 represents a set of components for a computer providing for the interception of accesses to a storage device.

FIG. 2 represents a set of components for the computer 101 that provides for the interception of accesses to a storage device. The computer 101 executes an operating system 203 that contains a file system 204. The file system 204 mounts the storage device 208 and maintains the original cataloging structure 207 on the storage device 208. Each time the storage device 208 is mounted, it is given a unique handle. Programs 201–202 use the handle to access files on the mounted storage device 208 through the file system 204. Normally, the storage device 208 is mounted with the storage device driver 206, which manages all requests by the file system 204 for direct access to the storage device 208. The access interceptor 205 is situated between the file system 204 and the storage device driver 206. If the storage device 208 is mounted with the access interceptor 205, requests for direct access to the storage device 208 are intercepted by the access interceptor 205 such that read accesses to the original cataloging structure 207 on the storage device 208 are redirected to an alternate cataloging structure 209, and write accesses to the original cataloging structure 207 on the storage device 208 are denied. Read accesses to other locations on the storage device 208 are relayed to the storage device driver 206, but write accesses are denied. As a result, storage device 208 becomes entirely read-only, and the alternate cataloging structure 209 functions as a read-only cataloging structure for the storage device 208 containing the original cataloging structure 207.

Figure 3:
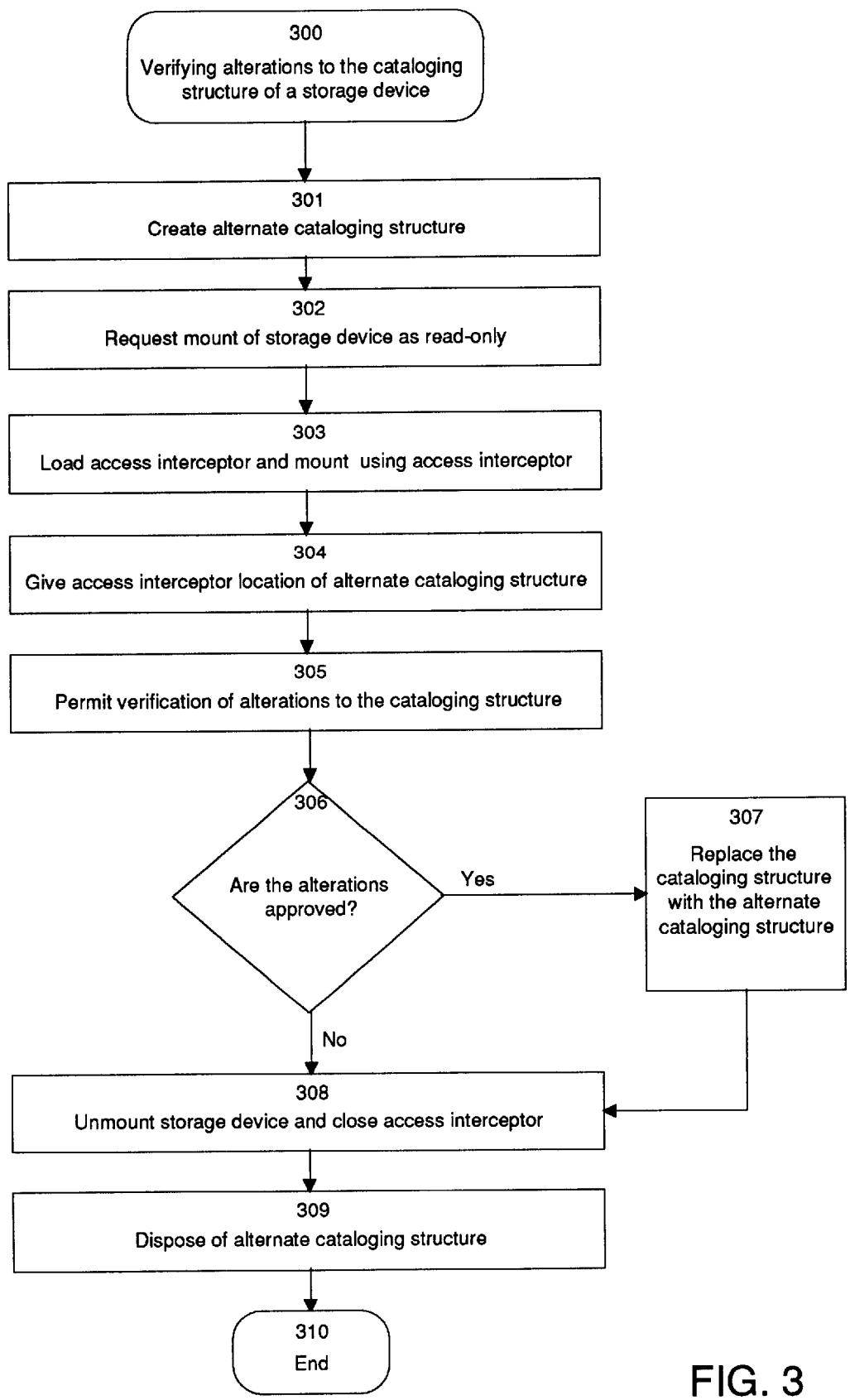
FIG. 3 is a flowchart diagram illustrating the process steps of a storage utility that utilizes the present invention to verify alterations made by the storage utility to an alternate cataloging structure.

FIG. 3, beginning at block 300, illustrates the operations of a storage utility 201 in one embodiment that utilizes the present invention to verify alterations made by the storage utility 201 to an alternate cataloging structure 209 of the storage device 208. The first operation is performed at step 301 to create an alternate cataloging structure 209. The alternate cataloging structure 209 is located separately from the original cataloging structure 207, whether on the storage device 208 containing the original cataloging structure 207, another storage device, or the memory 102. A method for creating an alternate cataloging structure 209 is detailed in co-pending U.S. patent application, Ser. No. 09/400,944, filed on Sep. 22, 1999, by the same inventor, entitled "Method for Repairing the Cataloging Structure On A Computer Storage Device."

At step 302, the storage utility 201 requests the file system 204 to mount the storage device 208, as read-only, using the storage device driver 206. If the original cataloging structure 207 was mountable, the file system 204 allocates a handle (h1) for the mounted storage device 208. Because the storage device driver 206 is being used for handle h1, accesses to the original cataloging structure 207 on the storage device 208 are not intercepted. At step 303, the storage utility 201 loads the access interceptor 205, if it is not already loaded, into the memory 102. The storage utility 201 then has the file system 204 mount the storage device 208 using the access interceptor 205, and a second handle (h2) for the storage device 208 is allocated. At step 304, the storage utility 201 gives the access interceptor 205 the location of the alternate cataloging structure 209 so that it can begin intercepting accesses to the storage device 208 through handle h2.

At step 305, the storage utility 201 waits for the alternate cataloging structure 209 to be verified by a computer program or the computer operator. If handle h1 was not allocated, then the files on the storage device 208 are now accessible through handle h2. If handle h1 was allocated, it is now possible to compare the original cataloging structure 207 on the storage device 208 to the alternate cataloging structure 209 by alternately specifying handle h1 and handle h2 when accessing the files on the storage device 208.

Step 306 resumes processing with the results of the verification of the alternate cataloging structure 209. If the alternate cataloging structure 209 is approved, then processing proceeds to step 307. At step 307, the contents of the original cataloging structure 207 on the storage device 208 are replaced with the contents of the alternate cataloging structure 209. If step 306 was resolved in the negative, then step 307 is skipped. In either case, processing continues to step 308 where handle h2 is unmounted, and the access interceptor 205 is closed. At step 309, the alternate cataloging structure 209 is disposed of.

Figure 4:
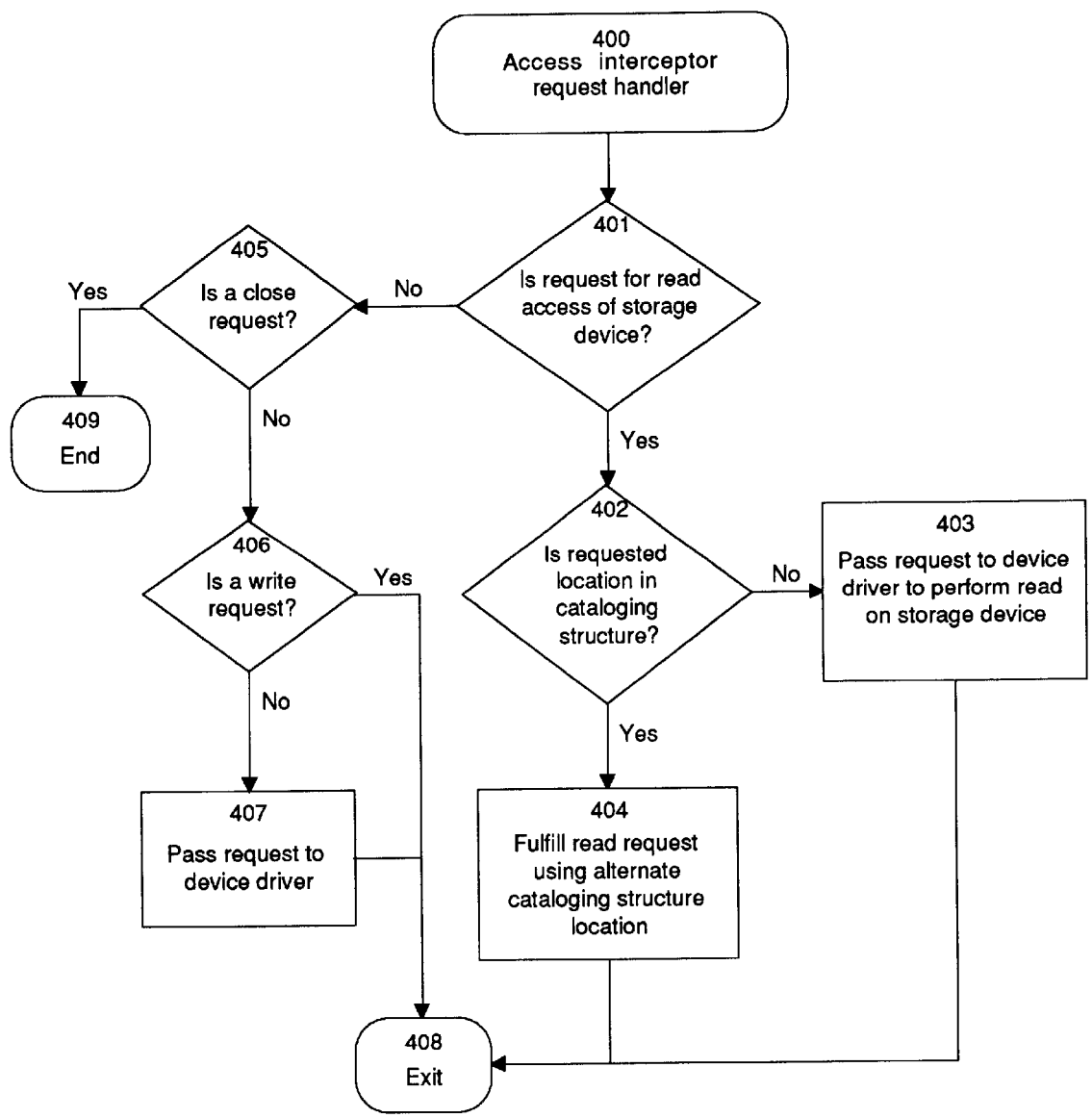
FIG. 4 is a flowchart diagram illustrating the process steps of the present invention.

The method of a preferred embodiment of the present invention is discussed in conjunction with the flowchart diagram shown in FIG. 4.

FIG. 4, beginning at block 400, illustrates the operation of the access interceptor 205. The access interceptor 205 handles various requests from the storage utility 201 and the file system 204. When the access interceptor 205 receives a request, it determines at step 401 whether the request is for read access to storage device 208. If so, then processing continues to step 402, at which a determination is made whether the read access is intended for a portion of the original cataloging structure 207 on the storage device 208. If so, processing proceeds to step 404, and the access interceptor 205 fulfills the read request by reading from the equivalent portion of the alternate cataloging structure 209. If the determination at step 402 is resolved in the negative, then processing proceeds to step 403 where the storage device driver 206 is called to complete the read request in the normal manner. Both step 403 and step 404 proceed to step 408 to exit the access interceptor 205 until a new request is received.

If it was determined at step 401 that the request was not for read access to storage device 208, processing proceeds to step 405. At step 405, a determination is made whether the received request was a close request. If a close request was received, then processing proceeds to step 409, and the access interceptor 205 terminates. Otherwise, processing proceeds to step 406 where a determination is made whether the request was a write request. Since write requests are denied, if a write request was received, then processing proceeds to step 408 to exit the access interceptor 205 until a new request is received. If a write request was not received, then the request is not handled by the access interceptor 205 and, at step 407, storage device driver 206 is called to handle the request. Processing then proceeds to step 408 to exit the access interceptor 205 until a new request is received.

A preferred embodiment of the present invention has been described herein, but it will be understood by those skilled in the art that various changes in form may be made without departing from the spirit and scope of the claimed invention as defined in the appended claims.

What is claimed:

1. In a computer system, a method for allowing verification of alterations to an original cataloging structure on a storage device comprising the steps of:

(1) creating an altered cataloging structure, capable of replacing the original cataloging structure, in a location different from that of the original cataloging structure;

(2) temporarily activating an access interceptor situated between the computer system's storage device and software, wherein the software is selected from an operating system, a component of the operating system, a file system, and a user program;

(3) having the access interceptor direct read accesses away from original cataloging structure to the altered cataloging structure; and (4) having the access interceptor deny all write accesses to the temporarily-static original cataloging structure, the temporarily-static altered cataloging structure and all other portions of the storage device.

2. The method of claim 1 wherein the altered cataloging structure minimally contains all contents of the original cataloging structure.

3. The method of claim 1 which further comprises:

(5) determining whether to replace the original cataloging structure with the altered cataloging structure, by means of an entity selected from a computer program or a computer operator.

(6) deactivating the access interceptor.

4. In a computer system, a method for allowing verification of alterations to an original cataloging structure on a storage device comprising the steps of:

(1) creating an altered cataloging structure, capable of replacing the original catalog structure, in a location different from that of the original cataloging structure;

(2) mounting the storage device as read-only;

(3) loading an access interceptor between a file system and a storage device driver, the storage device driver further connected to the storage device;

(4) having the access interceptor temporarily direct read accesses away from the original cataloging structure to the altered cataloging structure;

(5) having the access interceptor temporarily deny all write accesses to the temporarily static original cataloging structure, the temporarily static altered cataloging structure and all other portions of the storage device.

(6) determining whether to approve the altered cataloging structure;

(7) upon approval, replacing the original cataloging structure with the altered cataloging structure; and (8) disposing of the altered cataloging structure.

5. The method of claim 4 wherein the altered cataloging structure minimally contains all contents of the original cataloging structure.

6. The method of claim 4 wherein step (6) is performed by an entity selected from a computer program or a computer operator.

* * * * *

UNITED STATES PATENT AND TRADEMARK OFFICE
CERTIFICATE OF CORRECTION

| | |
|---|---|
| PATENT NO. | : 6,795,833 B1 |
| DATED | : September 21, 2004 |
| INVENTOR(S) | : Albert E. Dion II |

It is certified that error appears in the above-identified patent and that said Letters Patent is hereby corrected as shown below:

Title page,
Item [75], Inventors, insert inventors name -- Albert E. Dion II --

Signed and Sealed this

Twenty-first Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,795,833 B1
DATED : September 21, 2004
INVENTOR(S) : Albert E. Dion II It is certified that error appears in the above-identified patent and that said Letters Patent is hereby corrected as shown below:

<u>Title page,</u>
Item [75], Inventors, insert -- Albert E. Dion II --.

Signed and Sealed this

Eighteenth Day of April, 2006

JON W. DUDAS
*Director of the United States Patent and Trademark Office*